US 8,543,752 B2

(12) United States Patent
Cong et al.

(10) Patent No.: US 8,543,752 B2
(45) Date of Patent: Sep. 24, 2013

(54) PERIPHERAL COMPONENT INTERCONNECT EXPRESS INTERFACE CARD WITH A SWITCH

(75) Inventors: Wei-Dong Cong, Shenzhen (CN); Guo-Yi Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 105 days.

(21) Appl. No.: 13/191,457

(22) Filed: Jul. 27, 2011

(65) Prior Publication Data

US 2012/0317330 A1    Dec. 13, 2012

(30) Foreign Application Priority Data

Jun. 8, 2011 (CN) .......................... 2011 1 0152347

(51) Int. Cl.
   *G06F 13/00* (2006.01)
(52) U.S. Cl.
   USPC .......................................... 710/301; 710/313
(58) Field of Classification Search
   USPC ................................. 710/301, 313
   See application file for complete search history.

(56) References Cited

U.S. PATENT DOCUMENTS

| 2005/0240713 A1* | 10/2005 | Wu et al. ...................... 710/314 |
| 2007/0162624 A1* | 7/2007 | Tamasi et al. ..................... 710/8 |
| 2008/0059678 A1* | 3/2008 | Jian ............................... 710/301 |
| 2011/0043989 A1* | 2/2011 | Tien et al. ..................... 361/679.4 |
| 2011/0047309 A1* | 2/2011 | Brinkmann et al. .......... 710/261 |
| 2011/0113178 A1* | 5/2011 | Hosoi et al. ................... 710/313 |
| 2011/0185163 A1* | 7/2011 | Hidaka ........................... 713/2 |
| 2011/0202707 A1* | 8/2011 | Moon et al. ................... 711/103 |
| 2011/0252178 A1* | 10/2011 | Wang et al. ................... 710/316 |
| 2011/0264840 A1* | 10/2011 | Loffink ......................... 710/315 |
| 2012/0166699 A1* | 6/2012 | Kumar et al. ................. 710/306 |

* cited by examiner

*Primary Examiner* — Glenn A Auve
(74) *Attorney, Agent, or Firm* — Altis Law Group, Inc.

(57) ABSTRACT

An exemplary Peripheral Component Interconnect Express (PCIE) interface card is electrically coupled to a CPU. The PCIE interface card includes a circuit board, a first PCIE interface module arranged on the circuit board, at least one second PCIE interface module arranged on the circuit board, and a PCIE switch arranged on the circuit board. The PCIE switch is electrically coupled to the first PCIE interface module and the at least one second PCIE interface module. The PCIE switch transmits data from the CPU to the first PCIE interface module, and exchanges data between the CPU and the at least one second PCIE interface module.

10 Claims, 2 Drawing Sheets

PERIPHERAL COMPONENT INTERCONNECT EXPRESS INTERFACE CARD WITH A SWITCH

BACKGROUND

1. Technical Field

The present disclosure relates to interface cards, and particular, to a Peripheral Component Interconnect Express (PCIE) interface card.

2. Description of Related Art

PCIE is a high-speed I/O bus, and can be used in mobile devices, desktop computers, and servers. A common PCIE interface card is a PCIE interface video card, a PCIE interface network card, or a PCIE interface sound card.

However, because a PCIE interface card is only limited to having a single function, such as a video card function, a network card function, or a sound card function, and because one PCIE interface card occupies a slot on a motherboard, many PCIE interface cards occupy much space in a computer. Additionally, there must be many slots on the motherboard to electrically connect a CPU of the motherboard to the PCIE interface cards. Thus, manufacture of the motherboard is complicated.

Therefore, what is needed is a new PCIE interface card that can overcome the described limitations.

DETAILED DESCRIPTION

Embodiments will now be described in detail with reference to drawings.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
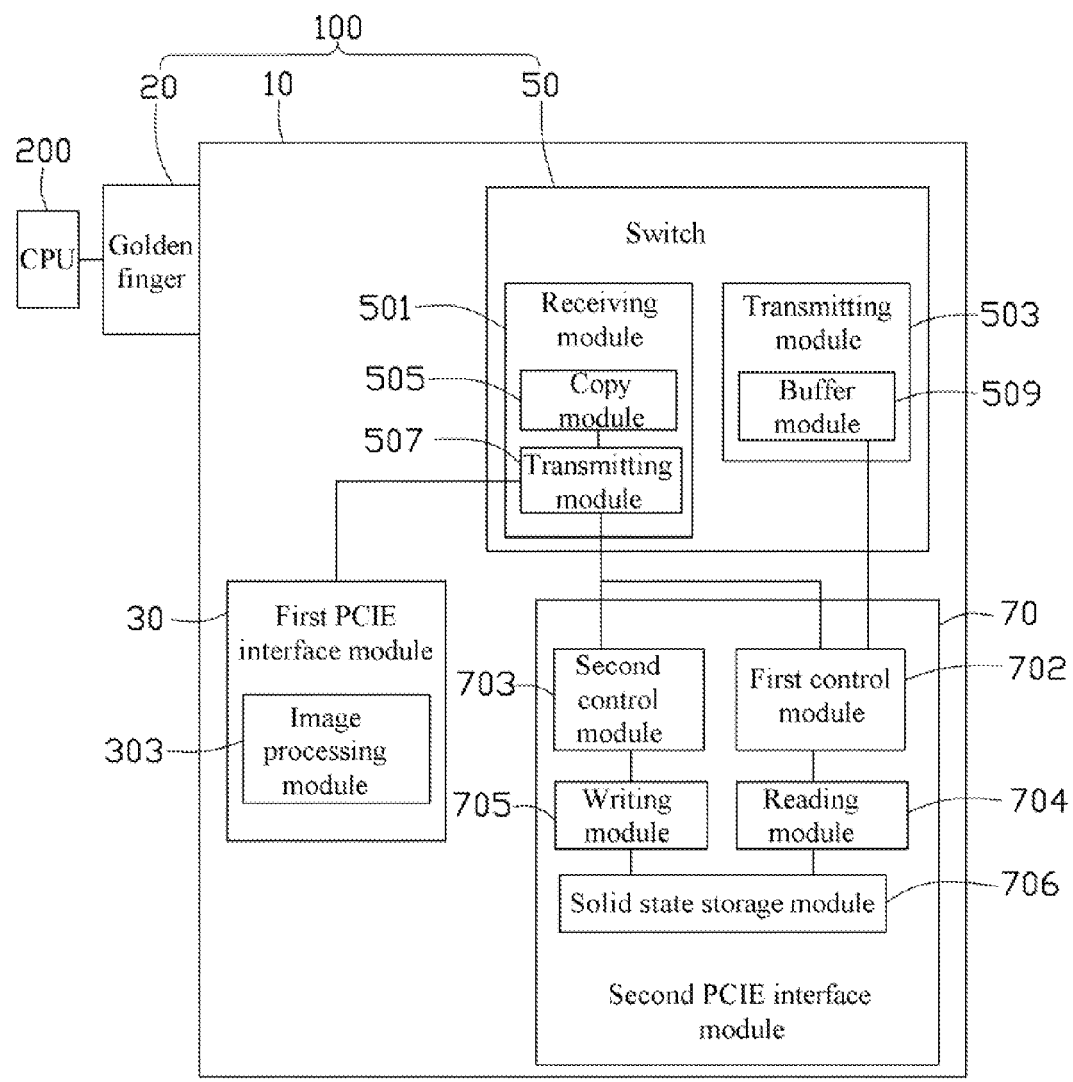
FIG. 1 is a block diagram of a PCIE interface card according to a first embodiment.

Referring to FIG. 1, a PCIE interface card 100, in accordance with an exemplary embodiment, is electrically coupled to a CPU 200.

The PCIE interface card 100 includes a circuit board 10 having a plurality of golden fingers 20 extending from the circuit board 10 and electrically coupled to the CPU 200. A first PCIE interface module 30 is positioned on the circuit board 10, and a PCIE switch 50 is arranged on the circuit board 10 and electrically coupled to the golden fingers 20 and the first PCIE module 30. A second PCIE interface module 70 is arranged on the circuit board 10 and electrically coupled to the PCIE switch 50.

In the present embodiment, the first PCIE interface module 30 is a video card module, and includes an image processing module 303. The first PCIE interface module 30 receives a data packet based on a PCIE protocol from the CPU 200, and transmits the data packet to the image processing module 303. The image processing module 303 is a microprocessor for performing image processing based on an image processing command in the data packet from the CPU 200. In other embodiments, the first PCIE interface module 30 may be a network card module, a sound card module, for example.

The PCIE switch 50 transmits data from the CPU 200 to the first PCIE interface module 30 and exchanges data between the CPU 200 and the second PCIE interface 70. In the present embodiment, the PCIE switch 50 includes a receiving module 501 and a transmitting module 503.

The receiving module 501 receives a data packet from the CPU 200, and transmits the data packet to the first PCIE interface module 30 and the second PCIE interface module 70. The receiving module 501 includes a copy module 505 and a transmitting module 507 electrically coupled to the copy module 505.

The copy module 505 makes two copies of the data packet, and transmits the two copied data packets to the transmitting module 507.

The transmitting module 507 receives the two copied data packets, and transmits the two copied data packets to the first PCIE interface module 30 and the second PCIE interface module 70, respectively.

After the first PCIE interface module 30 and the second PCIE interface module 70 receives the two copied data packets, the first PCIE interface module 30 and the second PCIE interface module 70 analyze the two copied data packets, respectively. If the copied data packet is the data packet for the first PCIE interface module 30 or the data pack for the second PCIE interface module 70, the first PCIE interface module 30 or the second PCIE interface module 70 will retain the copied data packet and perform the corresponding operation based on a command in the copied data packet. If the copied data packet is not the data packet for the first PCIE interface module 30 or the data packet for the second PCIE interface module 70, the first PCIE interface module 30 or the second PCIE interface module 70 will abandon the copied data packet, and wait for a next copied data packet.

The transmitting module 503 transmits a data packet from the second PCIE interface module 70 to the CPU 200 via the golden finger 20. The transmitting module 503 includes a buffer module 509. The buffer module 509 temporarily stores a plurality of data packets from the second PCIE interface module 70, such that the CPU 200 gathers one data packet at a time.

In the present embodiment, the second PCIE interface module 70 is a solid state hard disk module, and includes a first control module 702, a second control module 703, a reading module 704 electrically coupled to the first control module 702, a writing module 705 electrically coupled to the second control module 702, and a solid state storage module 706 electrically coupled to the reading module 704 and the writing module 705.

The second PCIE interface module 70 transmits a data packet based on the PCIE protocol from the solid state storage module 706 to the buffer module 509, and receives a data packet based on the PCIE protocol from the CPU 200 via the PCIE switch 50.

The first control module 702 analyzes a data packet from the transmitting module 507, gains a data reading command, and transmits the data reading command to the reading module 704. In addition, package the data read by the reading module 704 into a data packet based on the PCIE protocol, and then transmits the packaged data packet to the buffer module 509.

The second control module 703 analyzes a data packet from the transmitting module 507, gains a data writing command and a storable data, and transmits the data writing command and the storable data to the writing module 705.

The reading module 704 performs the data reading command from the first control module 702, reads data from the solid state storage module 706, and transmits the read data to the first control module 702.

The writing module 705 performs the data writing command from the second control module 703, and writes the storable data into the solid state storage module 706.

In alternative embodiments, the second PCIE interface module 70 may be a PCIE interface network card module, or a PCIE interface sound card module. In further alternative embodiments, except the first PCIE interface module 30 and the second PCIE interface module 70 on the circuit board 10, a PCIE interface sound card module electrically coupled to the PCIE switch 50, a PCIE interface network card module electrically coupled to the PCIE switch 50, a PCIE interface solid state hard disk module electrically coupled to the PCIE switch 50, or more PCIE interface modules electrically coupled to the PCIE switch 50 may be arranged on the circuit board 10.

In still further embodiments, the first PCIE interface module 30 may be a solid state hard disk module. In such case, the PCIE switch 70 is configured for exchanging data between the CPU 200 and the first PCIE interface module 30 and exchanging data between the CPU 200 and the second PCIE interface 70.

Figure 2:
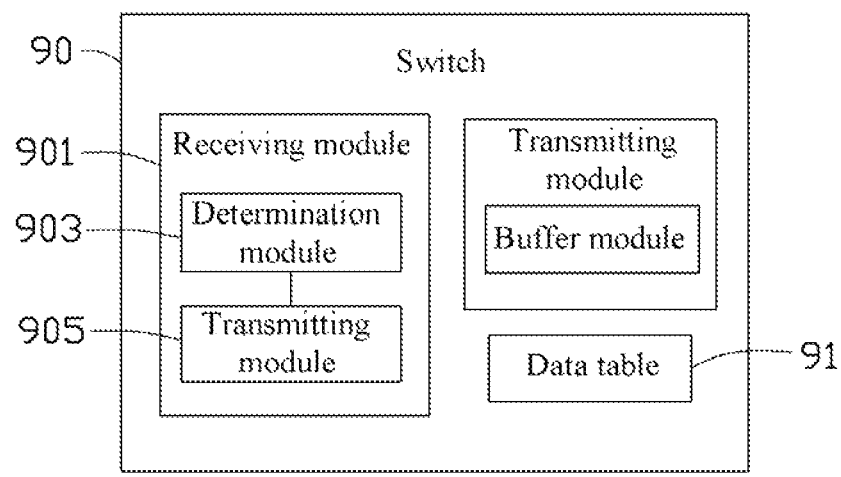
FIG. 2 is a block diagram of a PCIE switch of a PCIE interface card according to a second embodiment.

In the present embodiment, because the first interface module 30 and the second interface module 70 are arranged on the circuit board 10 of the PCIE interface card 100, the CPU 200 can be electrically coupled to two PCIE interface modules with different functions via one PCIE interface card 100. Accordingly, a space occupied by the first PCIE interface module 30 and the second PCIE interface module 70 in a computer can be reduced, and the volume of the computer can be reduced. In addition, compared to the two PCIE interface modules with different functions on two PCIE interface cards, respectively, the number of the PCIE interface card 100 can be reduced, and the number of slots on a motherboard can be reduced. The manufacturing of the motherboard can thus be simplified Referring to FIG. 2, a PCIE switch 90 of a PCIE interface card, in accordance with a second embodiment, includes a data table 91. The data table 91 includes two preset data packet headers and two preset PCIE interface modules corresponding to the preset data packet headers, respectively. In other embodiments, there may be three, four, or more preset data packet headers and three, four, or more preset PCIE interface modules corresponding to the preset data packet headers, respectively, in data table 91.

For clearly showing the data table 91, a table 1 is given. Understandably, the data in the table 1 can be changed by the user based on need.

TABLE 1

| data packet header | 01000111 00000111 | 01111000 11111100 |
|---|---|---|
| PCIE interface module | first PCIE interface module | second PCIE interface module |

A receiving module 901 of the PCIE switch 90 includes a determination module 903 and a transmitting module 905 electrically coupled to the determination module 903.

The determination module 903 is configured for receiving a data packet from the CPU 200 via the golden finger 20, and finding a PCIE interface module corresponds to a data packet header of the data packet in the table 1.

The transmitting module 905 is configured for transmitting the data packet to the corresponding PCIE interface module based on a finding result from the determination module 903.

In the present embodiment, when a data packet header of the data packet received by the determination module 903 is "01000111 00000111", the transmitting module 905 will transmit the data packet with the data packet header "01000111 00000111" to the first PCIE interface module 30. When a data packet header of the data packet received by the determination module 903 is "01111000 11111100", the transmitting module 906 will transmit the data packet with the data packet header "01111000 11111100" to the second PCIE interface module 70

While certain embodiments have been described and exemplified above, various other embodiments will be apparent from the foregoing disclosure to those skilled in the art. The disclosure is not limited to the particular embodiments described and exemplified but is capable of considerable variation and modification without departure from the scope and spirit of the appended claims.

What is claimed is:

1. A Peripheral Component Interconnect Express (PCIE) interface card, the PCIE interface card configured for being electrically coupled to a CPU, comprising:
   a circuit board;
   a first PCIE interface module arranged on the circuit board;
   at least one second PCIE interface module arranged on the circuit board, and
   a PCIE switch arranged on the circuit board, the PCIE switch electrically coupled to the first PCIE interface module and the at least one second PCIE interface module, the PCIE switch configured for transmitting data from the CPU to the first PCIE interface module, and exchanging data between the CPU and the at least one second PCIE interface module, wherein the PCIE switch comprises a copy module and a transmitting module electrically coupled to the copy module, the copy module configured for making at least two copies of a data packet from the CPU, and transmitting the at least two copied data packets to the first PCIE interface module and the at least one second PCIE interface module, respectively.

2. The PCIE interface card of claim 1, wherein a number of the at least one second PCIE interface module is one, and the second PCIE interface module is a solid state hard disk module.

3. The PCIE interface module of claim 2, wherein the second PCIE interface module comprises a first control module, a second control module, a reading module, a writing module, and a solid state storage module, the first control module is configured for analyzing a data packet sent from the CPU via the PCIE switch, gaining a data reading command, and transmitting the data reading command to the reading module, packaging data read by the reading module into a data packet based on the PCIE protocol, and transmitting the packaged data packet to the PCIE switch, the second control module analyzing a data packet sent from the CPU via the PCIE switch, gaining a data writing command and a storable data, and transmitting the data writing command and the storable data to the writing module, the reading module is configured for performing the data reading command from the first control module, reading data from the solid state storage module, and transmitting the read data to the first control module, and the writing module is configured for performing the data writing command from the second control module, and writing the storable data into the solid state storage module.

4. A Peripheral Component Interconnect Express (PCIE) interface card, the PCIE interface card configured for being electrically coupled to a CPU, comprising:
- a circuit board, the circuit board having a plurality of golden fingers extending from the circuit board for being electrically coupled to the CPU;
- a first PCIE interface module arranged on the circuit board;
- at least one second PCIE interface module arranged on the circuit board, and
- a PCIE switch arranged on the circuit board, the PCIE switch electrically coupled to the first PCIE interface module and the at least one second PCIE interface module, the PCIE switch configured for transmitting data from the CPU to the first PCIE interface module, and exchanging data between the CPU and the at least one second PCIE interface module, wherein the PCIE switch comprise a data table, the data table comprises a plurality of preset data packet headers and a plurality of corresponding preset PCIE interface modules, the PCIE switch further comprises a determination module and a transmitting module electrically coupled to the determination module, the determination module is configured for receiving a data packet from the CPU, and finding a PCIE interface module corresponding to the data packet header of the data packet, the transmitting module is configured for transmitting the data packet to the corresponding PCIE interface module based on a finding result of the determination module.

5. The PCIE interface module of claim 4, wherein a number of the at least one second PCIE interface module is one, and the second PCIE interface module is a solid state hard disk module.

6. The PCIE interface module of claim 5, wherein the second PCIE interface module comprises a first control module, a second control module, a reading module, a writing module, and a solid state storage module, the first control module is configured for analyzing a data packet sent from the CPU via the PCIE switch, gaining a data reading command, and transmitting the data reading command to the reading module, packaging data read by the reading module into a data packet based on the PCIE protocol, and transmitting the packaged data packet to the PCIE switch, the second control module analyzing a data packet sent from the CPU via the PCIE switch, gaining a data writing command and a storable data, and transmitting the data writing command and the storable data to the writing module, the reading module is configured for performing the data reading command from the first control module, reading data from the solid state storage module, and transmitting the read data to the first control module, and the writing module is configured for performing the data writing command from the second control module, and writing the storable data into the solid state storage module.

7. The PCIE interface card of claim 4, wherein the first interface module is a video card module, a network card module or a sound card module.

8. A Peripheral Component Interconnect Express (PCIE) interface card, the PCIE interface card configured for being electrically coupled to a CPU, comprising:
- a circuit board;
- a first PCIE interface module arranged on the circuit board;
- at least one second PCIE interface module arranged on the circuit board, and
- a PCIE switch arranged on the circuit board, the PCIE switch electrically coupled to the first PCIE interface module and the at least one second PCIE interface module, the PCIE switch configured for transmitting data from the CPU to the first PCIE interface module, and exchanging data between the CPU and the at least one second PCIE interface module, wherein the PCIE switch comprises a buffer module, the buffer module is configured for temporarily storing a plurality of the data packets from the at least one second PCIE interface module.

9. The PCIE interface card of claim 8, wherein a number of the at least one second PCIE interface module is one, and the second PCIE interface module is a solid state hard disk module.

10. The PCIE interface module of claim 9, wherein the second PCIE interface module comprises a first control module, a second control module, a reading module, a writing module, and a solid state storage module, the first control module is configured for analyzing a data packet sent from the CPU via the PCIE switch, gaining a data reading command, and transmitting the data reading command to the reading module, packaging data read by the reading module into a data packet based on the PCIE protocol, and transmitting the packaged data packet to the PCIE switch, the second control module analyzing a data packet sent from the CPU via the PCIE switch, gaining a data writing command and a storable data, and transmitting the data writing command and the storable data to the writing module, the reading module is configured for performing the data reading command from the first control module, reading data from the solid state storage module, and transmitting the read data to the first control module, and the writing module is configured for performing the data writing command from the second control module, and writing the storable data into the solid state storage module.

* * * * *